Jan. 25, 1955   M. KASSER   2,700,369
CAGE FOR POULTRY AND THE LIKE
Filed Aug. 27, 1949   2 Sheets-Sheet 1

INVENTOR.
MORRIS KASSER
BY
ATTORNEY

Jan. 25, 1955  M. KASSER  2,700,369
CAGE FOR POULTRY AND THE LIKE
Filed Aug. 27, 1949  2 Sheets-Sheet 2

INVENTOR.
MORRIS KASSER
BY
George B White
ATTORNEY

United States Patent Office 2,700,369
Patented Jan. 25, 1955

2,700,369

CAGE FOR POULTRY AND THE LIKE

Morris Kasser, Roseville, Calif., assignor of one-fourth to Willard B. Shepherd, Sacramento County, one-fourth to Samuel S. Kingston, San Francisco, and one-fourth to Sheldon B. Kingston, Sacramento County, Calif.

Application August 27, 1949, Serial No. 112,713

12 Claims. (Cl. 119—22)

This invention relates to a cage structure for multi-deck cage batteries in hen houses and the like.

Particularly it is an object of the invention herein to provide a cage structure whereby a plurality of superimposed tiers of cages can be suspended in a cage house spaced above the floor, and which are provided with pans for receiving the droppings of the chickens or hens through the bottoms of the cages, which pans contain a liquid, such as water, or water containing a suitable disinfectant; a mechanism being provided for tipping the pans, so as to dump the droppings and the liquids to the floor on the side away from the feeding fronts of the cages, thereby keeping the accumulation of droppings away from the paths where the attendant must move for feeding or removing eggs or replacing chickens and hens or the like.

Another object of the invention is to provide a plurality of tiers of hen cages in suitably spaced relation to accommodate pans therebetween which pans contain a liquid into which the droppings from the cages are received, and a mechanism which can easily move said pans into a position for the dumping out of contents thereof.

Other objects and advantages will appear as the specification proceeds and the novel features of the device will be particularly pointed out in the claims hereto annexed.

In this specification and the annexed drawings, the invention is illustrated in the form considered to be the best but it is understood, that the invention is not limited to such form; and it is also to be understood that in and by the claims following the description, it is desired to cover the invention in whatsoever form it may be embodied.

The invention is clearly illustrated in the accompanying drawings, wherein.

Figure 1:
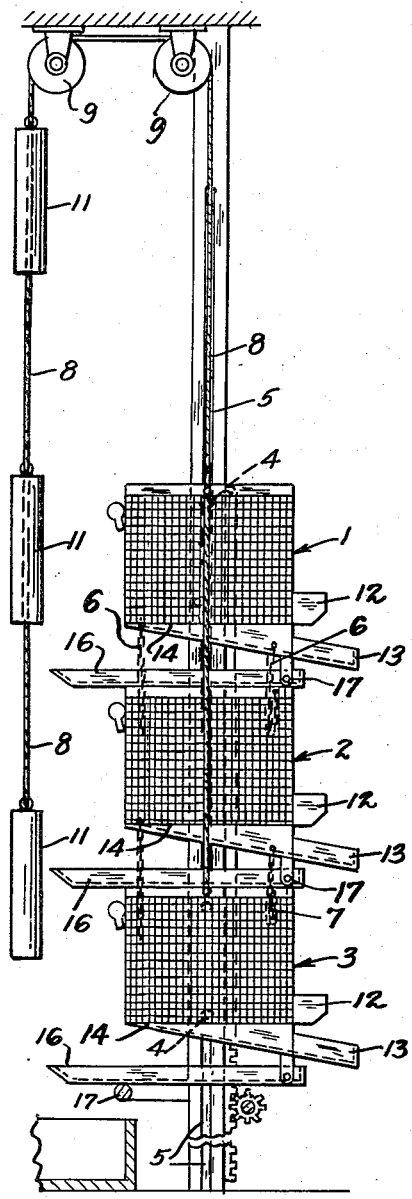
Fig. 1 is a side view of embodiment of my multi-tier or multi-deck cage structure, showing the tiers lowered and the pans leveled.
Figure 2:
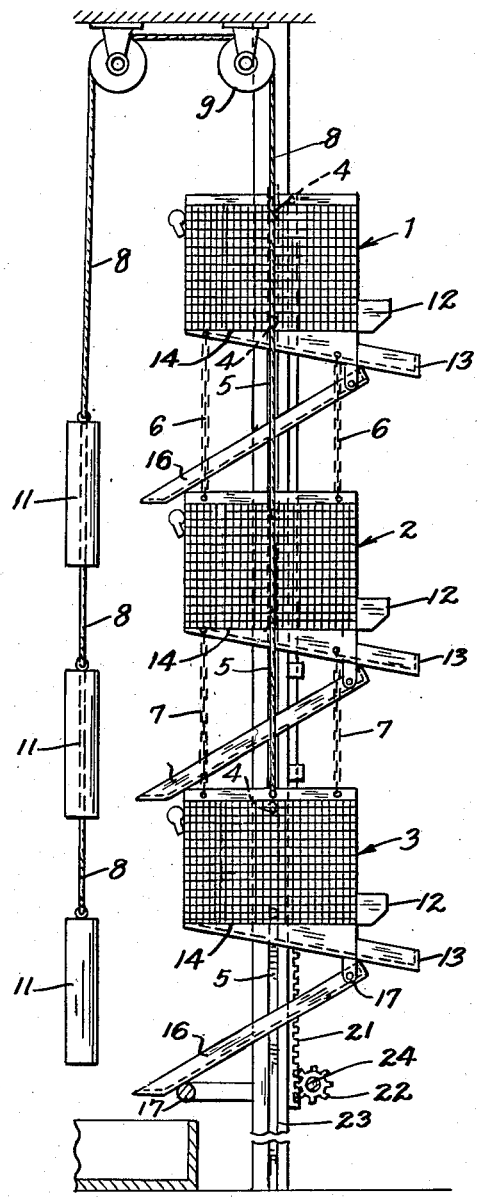
Fig. 2 is a side view of said embodiment showing the tiers lifted apart and the pans lifted.
Figure 3:
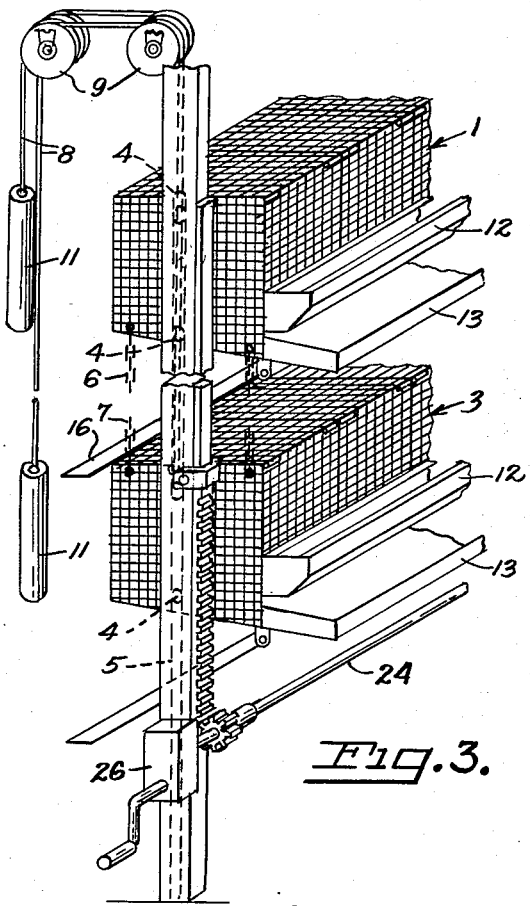
Fig. 3 is a fragmental perspective view of said embodiment.

Broadly the invention includes a plurality of tiers or decks 1, 2 and 3, each of which contains a series of cages, which tiers are spaced one above another. Such hen or chicken cages are usually divided into individual compartments but each series or row is made as a single unit or it may be made of several connected units. The cages are suitably guided by pairs of pins 4 on the opposite ends of the rows of cages which slide in grooves in fixed vertical frame member 5. Chains 6 connect the rear and front edges of the top tier 1 and the next lower tier 2 so that when the top row of cages is raised the chains 6 are stretched out and the second row of cages is lifted.

Similar chains 7 connect the front and rear edges of the second tier of cages and the lowest tier of cages. Thus, after the second tier of cages is lifted sufficiently far to stretch out the chains 7, it lifts the lowest tier of cages.

In order to facilitate the lifting of the respective tiers of cages, counterweights are provided for each tier of cages. In the form herein, a line 8 is extended from each cage upwardly and through a pulley 9 journalled on the frame of the house, and a counterweight 11 hangs on the free ends of each line 8. The counterweight 11 is slightly lighter than the weight of a row of cages so that when released the cages or the tiers of cages return to their initial position by gravity.

Each cage is made up of usual wire structure and has on its front a feed trough 12 under which is an egg holder tray 13 into which leads the inclined bottom 14 of the cage. The bottom 14 is made of perforate material, preferably also of wiring, so that the droppings of the poultry can drop through the same.

A pan 16 is disposed below each tier of cages. The pan 16 is pivoted on pivot brackets 17 at the side of the tier of cages and under the egg holder 13. The other edge of the pan 16 normally rests upon the top of the tier of cages beneath it, but extends beyond the rear sides of the cages, oppositely from the side with the feed trough 12 and the egg holder 13. The lower tier of cages 3 has its pan 16 resting upon suitable supporting bars 17 which latter may be either extended from the side of the building or supported on some frame on the floor if needed. The pans are filled normally with a liquid. Water may be sufficient to prevent the caking of the droppings in the trays, however in some instances suitable disinfectant may be mixed in the water so that double purpose is accomplished, namely the droppings are kept in a form to be easily dumped out of the pans 16, and also the pans 16 are disinfected and thereby further reduce the possibility of spreading of poultry diseases.

In operation in this form the pans contain the liquid and the droppings collect in the liquid. When it is desired to empty the pans 16 the top weight line 8 connected to the top tiers can be pulled and as the cages are lifted the free end of the pan remains resting upon the lower tier thereby the pan is tilted and its contents are dropped to the outside of the building away from the line of tiers. As the upper tier is pulled further the next tier follows and is pulled by the chains 6 so as to similarly tilt the pan 16 and dump the contents of the second pans 16 under the second row of tiers of cages, and when that reaches a certain height then the lowest tier is lifted by its chains 7 and the pan 15 thereunder is dumped.

Another convenient lifting device is shown in the form of a rack bar 21 fixed to each end of the top cage row 1, and a pinion 22 in engagement with the teeth of the rack bar 21 and journalled on frame posts 23. The pinions 22 are suitably connected, for instance by a shaft 24, to which is connected a suitable crank transmission 26 for simultaneously turning both pinions 22 and thus raising and lowering the top cage row 1 for pan dumping operation heretofore described.

Figure 4:
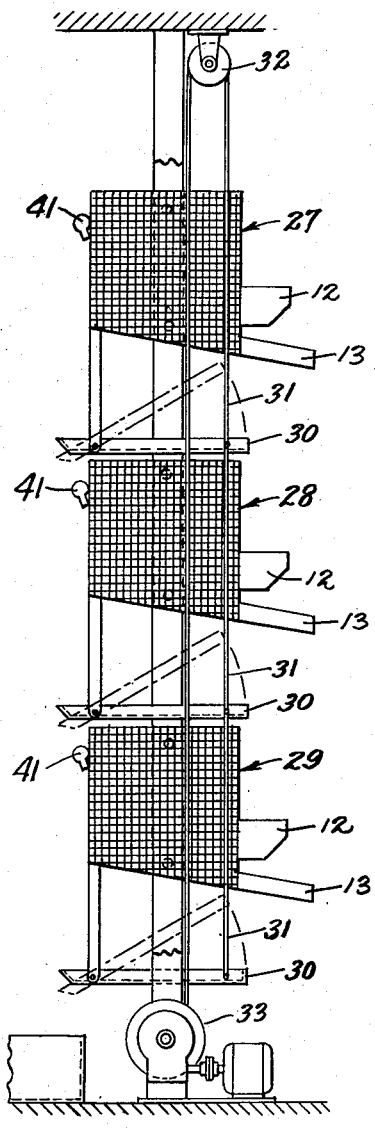
Fig. 4 is a side view of modified embodiment of my invention.

In the modified form shown in Fig. 4 the superimposed cage decks or tiers 27, 28 and 29 are spaced apart sufficiently far to permit the tilting of the pans 30 therebetween without raising the cages. Each pan 30 is pivoted at its dumping edge to the cages beneath it and the other edges thereof are connected to a rope or cable 31 which is played around a pulley 32 and has a winding drum devices 33 on its free end. The winding drum devices 33 on the opposite side are suitably connected for simultaneous winding at both ends for lifting or lowering the pans 30.

Figure 5:
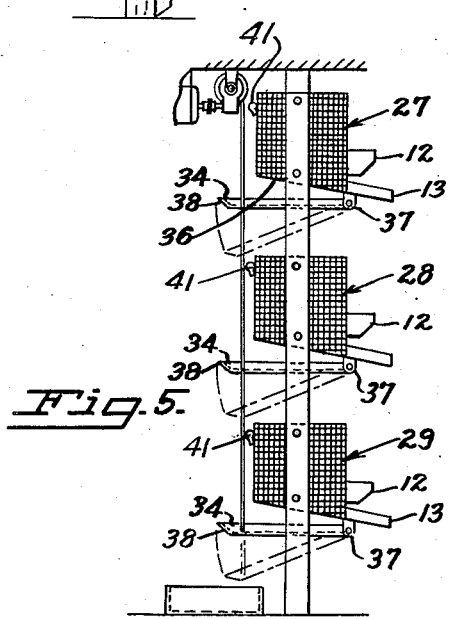
Fig. 5 is a side view of another modified form of my invention.

In the modified form shown in Fig. 5, the tiers of cages 27, 28 and 29 are the same as in the previous form, but each pan 34 below the respective cage is close to the bottom 36 of the cage above it and is pivoted on a pivot bracket 37 below the egg holder 13. The other or dumping edge 38 of the pan 34 is in this instance connected at each end thereof, to ropes or cables 31 and winding devices 33 heretofore described in connection with Fig. 4.

In all the forms of the invention the free or outer ends of the pans are extended beyond the rear of the cages where the cages are provided with the usual water dripping devices 41 for the drinking water for the poultry. These dripping devices are usually on the outer or rear side of each cage and therefore are above the outer end or dumping ends of the pans and the overflow water drops into the pans keeping the same filled.

In each of the forms the novel combination of compartment of cages in tiers are arranged in several superimposed decks or tiers and also providing for tiltable pans with water in them, and means to easily tilt the pans and dump the contents thereof away from the front side of the cages and of the way of the space from which the poultry is usually handled.

I claim:

1. The combination with a cage having a front, a rear and a perforate bottom; of a pan containing liquid normally disposed substantially horizontally beneath said bottom to receive droppings therethrough, a pivotal support on said cage substantially adjacent said front and operatively connected to said pan, and a device operatively associated with said pan for tilting and levelling said pan at will.

2. In combination with a cage having a front, a rear and a perforate bottom; of a pan containing liquid normally disposed substantially horizontally in spaced relation beneath said bottom to receive droppings therethrough, a pivotal support on said cage substantially adjacent said rear and operatively connected to said pan to permit rearward inclination of said pan, and a device operatively associated with said pan and inclining and levelling said pan at will.

3. The combination with a cage having a front, a rear and a perforate bottom; of a pan containing liquid beneath said bottom to receive droppings through said perforate bottom, a pivotal support on said cage to hold said pan beneath said bottom and permitting it to tilt downwardly toward said rear, a device operatively associated with said pan for tilting and levelling said pan at will, a drinking water feed device on the rear of the cage, said pan extending beyond and beneath said rear to receive overflow from said drinking water feed device.

4. A plurality of superimposed cages of the character described, the fronts of all the cages facing in the same direction, perforate bottoms on said cages inclining toward said fronts, pans between each two of said superimposed cages to receive droppings from said bottom, a pivotal support element on each of said cages operatively connected to each of said pans to hold it in position and permitting it to tilt, and a device connected to all of the pans for tilting and levelling all pans together at will to incline oppositely to the incline of the respective adjacent cage bottoms.

5. A plurality of superimposed cages of the character described, the fronts of all the cages facing in the same direction, perforate bottoms on said cages inclining toward said fronts, pans between each two of said superimposed cages to receive droppings from said bottoms, said pans containing liquid, a pivotal support element on each of said cages operatively connected to each of said pans to hold it in position and permitting it to tilt and a device connected to all of said pans for tilting and levelling all pans together at will to incline opposite to the incline of the respective adjacent cage bottoms.

6. A plurality of superimposed cages of the character described, the fronts of all the cages facing in the same direction, perforate bottoms on said cages inclining toward said fronts, pans between each two of said superimposed cages to receive droppings from said bottoms, a pivotal support member on each of said cages to hold said pans normally at substantially horizontal position, and means operatively connected to said pans to tilt said pans simultaneously about said pivotal support members to dump beyond the rear sides of said cages, said pans containing liquid, water feeding devices on the rear sides of said cages, said pans extending beyond and beneath said water feeding devices to receive overflow water therefrom.

7. A plurality of superimposed cages of the character described, the fronts of all the cages facing in the same direction, perforate bottoms on said cages inclining toward said fronts, pans between each two of said superimposed cages to receive droppings from said bottoms, and a pivotal support on each of said cages for supporting said pans normally in substantially horizontal position and permitting it to tilt, and a mechanism operatively associated with all of said pans for imparting tilting force to said pans to tilt said pans into a position inclined oppositely to said bottom for dumping beyond the rear sides of said cages.

8. In combination, a plurality of superimposed poultry cages, frame members supporting said cages in vertically spaced relation, front sides of said cages facing in the same direction, feeding elements on the front sides of said cages, egg collecting elements extended to the front sides of said cages, a pan outside of and spaced below each cage to receive droppings from the cage, elements on each of said cages operatively connected to each of said pans to support said pans in substantially horizontal position and permitting them to tilt downwardly and away from said front sides, and a device operatively connected to said pans for simultaneously tilting said pans relatively to said cages for dumping the droppings therefrom rearwardly with respect to said front sides.

9. In combination, a plurality of superimposed poultry cages, frame members supporting said cages in vertically spaced relation, front sides of said cages facing in the same direction, feeding elements on the front sides of said cages, egg collecting elements extended to the front sides of said cages, a pan outside of and spaced below each cage to receive droppings from the cage, a supporting element on each of said cages operatively connected to each of said pans in substantially horizontal position and permitting them to tilt downwardly and away from said front sides, water dripping devices on the sides of the cages fartherest from said front sides, rear edges of said pans extending beyond said water dripping device to collect water therefrom, and a device on said frame and operatively connected to said pans for simultaneously turning said pans from said horizontal position to tilt downwardly and away from said front sides of said cages for dumping the droppings therefrom rearwardly with respect to said front sides.

10. In combination, a plurality of superimposed poultry cages, frame members supporting said cages in vertically spaced relation, front sides of said cages facing in the same direction, feeding elements on the front sides of said cages, egg collecting elements extended to the front sides of said cages, a pan having opposed edges, said pan being outside of and spaced below each cage to receive droppings from the cage, each of said pans being normally at substantially horizontal position, a pivoting support at the bottom of each of said cages to pivotally mount one of the edges of each of said pans on each of said cages and a device for simultaneously changing the position of the other edges of the pans for tilting all of said pans downwardly and rearwardly with respect to said front sides.

11. In combination, a plurality of cages, frame members supporting said cages in vertically spaced relation, front sides of said cages facing in the same direction, feeding elements on said front sides of said cages, egg collecting elements extended to the front sides of said cages, a pan outside of and spaced below each cage to receive droppings from the cage, a pivoting support at the bottom adjacent said front side of each of said cages to pivotally mount one of said pans on each of said cages, a support element operatively associated with each of said pans on which said pans normally rest in generally horizontal position, generally balanced means connected to said cages to suspend said cages relatively movably along said frame members, said suspending means being adapted to pull said cages upwardly for lifting the pivoted ends of said pans therewith, thereby tilting said pans downwardly and rearwardly with respect to said front sides to dump the droppings from said pans in a direction away from said front sides.

12. In combination a plurality of tiers of poultry cages, frame members supporting said tiers in vertically spaced relation, front sides of said cages facing in the same direction, feeding elements on the front sides of said cages, egg collecting elements extended to the front sides of said cages, a pan outside of and spaced below each cage to receive droppings from the cage, each of said pans being pivoted on an axis generally parallel with said tiers, said tiers being spaced apart to permit the tilting of said pans, and a device connected to said pans to tilt said pans downwardly and rearwardly with respect to said front sides for dumping the droppings away from said front sides.

(References on following page)

References Cited in the file of this patent

UNITED STATES PATENTS

| Number | Name | Date |
|---|---|---|
| 492,046 | McKnight | Feb. 21, 1893 |
| 1,817,588 | Shaffer | Aug. 4, 1931 |
| 2,021,746 | Purnell | Nov. 19, 1935 |
| 2,105,058 | Smith et al. | Jan. 11, 1938 |
| 2,250,818 | Sperry | July 29, 1941 |
| 2,328,209 | Giguere | Aug. 31, 1943 |
| 2,388,157 | Kerr | Oct. 30, 1945 |
| 2,523,615 | Fell | Sept. 26, 1950 |

FOREIGN PATENTS

| 429,639 | Great Britain | Feb. 4, 1935 |